(12) United States Patent
O'Gorman et al.

(10) Patent No.: US 7,005,822 B1
(45) Date of Patent: Feb. 28, 2006

(54) TORQUE RIPPLE REDUCTION FOR A VOLTAGE MODE MOTOR CONTROLLER

(75) Inventors: Patrick A. O'Gorman, Grayslake, IL (US); Scott W. Repplinger, Lake Zurich, IL (US); Dennis L. Stephens, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 94 days.

(21) Appl. No.: 10/946,234

(22) Filed: Sep. 21, 2004

(51) Int. Cl.
*G05B 1/02* (2006.01)

(52) U.S. Cl. ............... 318/608; 318/611; 318/809; 318/811

(58) Field of Classification Search ........... 318/138, 318/245, 254, 439, 599, 105, 114, 606–608, 318/611, 623, 628, 805, 806, 809; 702/183; 324/510; 363/41
See application file for complete search history.

(56) References Cited

U.S. PATENT DOCUMENTS

| | | | | |
|---|---|---|---|---|
| 5,450,306 A | * | 9/1995 | Garces et al. ............ | 363/41 |
| 5,483,167 A | * | 1/1996 | Mikami .................. | 324/510 |
| 5,616,994 A | * | 4/1997 | Nagaoka et al. ......... | 318/254 |
| 5,631,999 A | * | 5/1997 | Dinsmore ............... | 388/805 |
| 6,456,946 B1 | | 9/2002 | O'Gorman | |
| 6,518,718 B1 | * | 2/2003 | Koga et al. ............. | 318/38 |
| 6,680,590 B1 | * | 1/2004 | Inoue et al. ............ | 318/114 |
| 6,694,287 B1 | * | 2/2004 | Mir et al. .............. | 702/183 |
| 2003/0046028 A1 | * | 3/2003 | Mir et al. .............. | 702/183 |
| 2003/0062868 A1 | * | 4/2003 | Mir et al. .............. | 318/599 |
| 2004/0007999 A1 | * | 1/2004 | Kushion et al. ......... | 318/442 |

FOREIGN PATENT DOCUMENTS

EP    1 298 783 A2    4/2003
WO    WO 01/20411 A1    3/2001

* cited by examiner

*Primary Examiner*—Paul Ip
(74) *Attorney, Agent, or Firm*—Brian M. Mancini

(57) ABSTRACT

A system and method for reducing torque ripple in a motor controller includes a step (60) of measuring an output voltage at each phase of the motor controller. A next step (61) includes determining a voltage mismatch between the phases. A next step (62) includes phase grounding one phase of the motor. A next step (63) includes calculating a voltage gain for the phases to compensate for voltage mismatches therebetween. The compensating gain can include a gain and/or offset, which are applied as a function of motor angle and is used to generate a PWM signal for driving the motor with reduced torque ripple.

19 Claims, 3 Drawing Sheets

TORQUE RIPPLE REDUCTION FOR A VOLTAGE MODE MOTOR CONTROLLER

FIELD OF THE INVENTION

This invention relates to electric motor controllers, and more particularly, to a system and a method that reduces torque ripple in a motor controller.

BACKGROUND OF THE INVENTION

Automobiles are steered by a system of gears and linkages that transmit the turning motion of the steering wheel to the front wheels. As automobile designs shift weight to the front wheels to improve riding comfort and vehicle handling, more effort is needed to turn the front wheels and provide sufficient torque to overcome the friction that exists between the front wheels and the road.

Power steering systems are designed to reduce steering effort and improve maneuverability. Some vehicles use engine driven hydraulics to amplify the torque applied by the steering wheel to the front wheels. A mechanically-driven or an electrically-driven pump maintains a hydraulic fluid, such as oil, under pressure. The rotation of the steering wheel actuates a valve, which supplies or drains fluid to a power cylinder, which reduces the steering effort needed to turn the wheels.

Some vehicles mechanically couple an electric motor to the steering shaft through steering gears. Variable torque assist levels can be realized when speed sensitive controllers alter the required torque to maneuver a vehicle based on vehicle speed. Such voltage mode controller systems are typically controlled by Pulse Width Modulation (PWM) circuits that drive gate circuits and Field Effect Transistor (FET) switches. However, nonlinearities in the circuit components (i.e. gates and FETs) result in voltage amplitude ripple in the controller, particularly when operating in an open loop mode. Moreover, at low values of PWM modulation index, these voltage amplitude variations result in noticeably unacceptable torque ripple components. For example, at low amplitude values of the modulating waveform, the PWM pulses are narrow and any nonlinearity in the gate drive or FETs will contribute a substantial amount of error. In particular, if the PWM pulse is 1% of full value, and the switching frequency is 20 kHz, the pulse width is 500 ns. A 50 ns nonlinearity would result in a 10% error in the width of the voltage provided by the motor controller, whereas a 50 ns nonlinearity on a PWM pulse at 10% or more of full value would result in a 1% or less error in the width of the voltage provided by the motor controller, which is much less noticeable.

To date, the only torque ripple component which remains a significant problem is associated with first-order power stage nonlinearities (called 1-per rev component). Other torque ripple components (e.g. second or third order nonlinearities called 2-per rev or 3-per rev components respectively) related to switch dead time and phase resistance imbalance have been mitigated to the point where they are no longer a significant contributor to the torque ripple problem.

Therefore, it is desirable to provide a system and method of reducing torque ripple in a motor controller that overcomes most, if not all, of the preceding problems.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF THE PREFERRED EMBODIMENTS

The present invention provides a system and method for reducing torque ripple in a motor controller. In particular, the present invention addresses the first-order, 1-per rev, torque ripple component, and is particularly suitable at low amplitude, open loop operation of a voltage mode controller, where torque ripple error is most prominent. Although the example presented herein is directed towards an electric power steering assist controller, it should be recognized that the present invention is applicable to any multi-phase electric motor controller.

Figure 1:
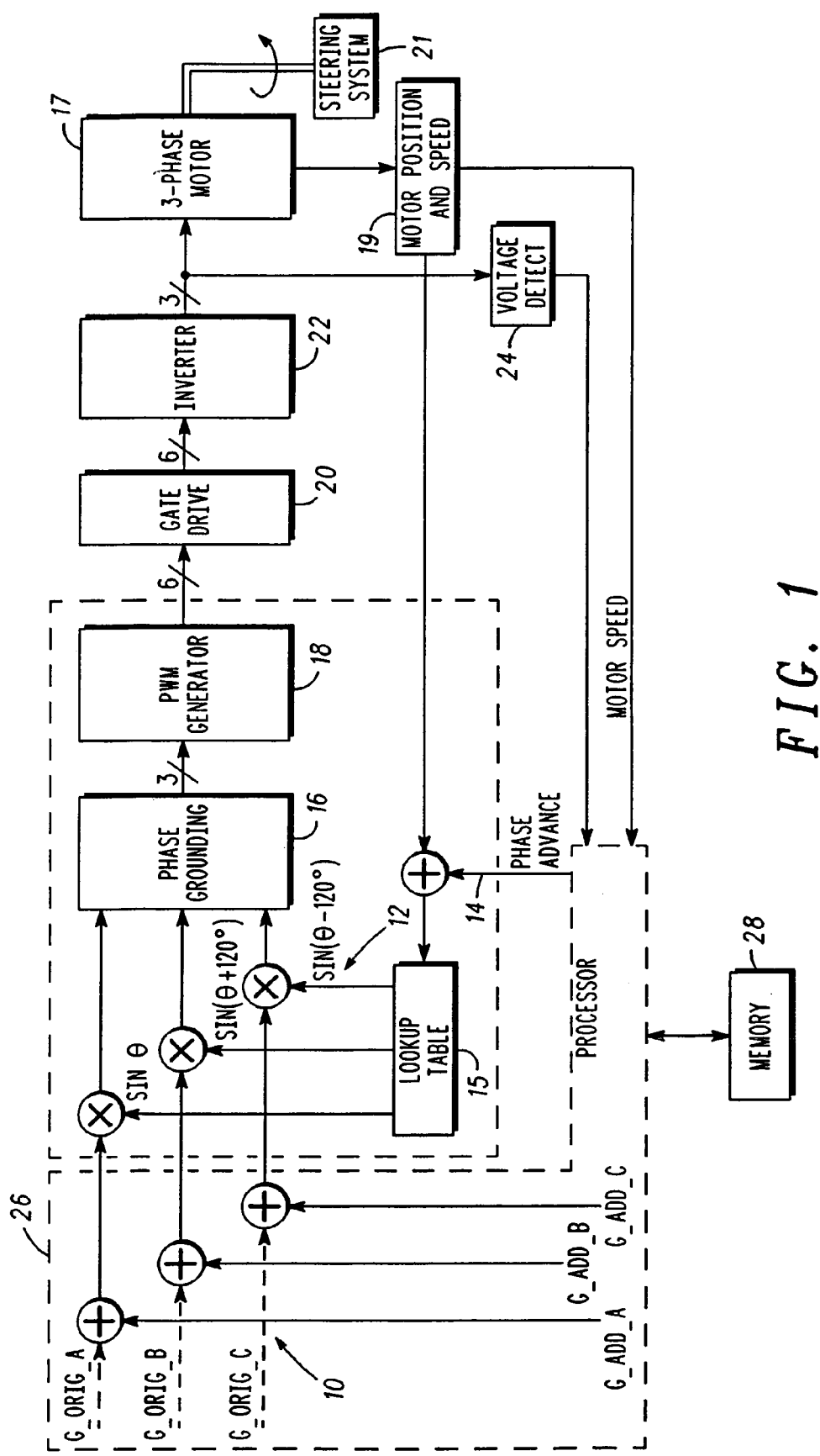
FIG. 1 shows a block diagram of a motor controller, in accordance with the present invention.

FIG. 1 shows a motor controller in accordance with the present invention. In practice, the motor controller is used to control a three-phase motor 17 that assists a steering system 21. The motor controller includes gain compensation 10, input modulators 12, phase grounding 16, a PWM generator 18, a gate driver 20, an inverter, typically composed of FET switches 22, a voltage detector 24, a processor 26, and a memory 28. Optionally, phase advancing 14 can be included to compensate for signal delays as a function of motor speed.

The voltage detector circuit 24 detects an output voltage at each phase of the motor controller to the motor 17. While the amplitude and phase of the three phase voltages can be measured by many applications, preferably a closed loop system that feeds back one or more of voltage, current, velocity or torque measurements is used. Thus in some digital exemplary embodiments, three digital values representing the instantaneous modulating signals can be derived from the voltage detector 24. Three phases: A, B, C are used in the example shown. However, any number of phases can be used in the present invention. The voltage detector circuit 24 can be an independent circuit or can be incorporated into one of the other circuits, such as the processor 26. In addition, the voltage detector 24 can be connected to other points of the motor controller. The voltage detector 24 is coupled with the processor 26. Either of the voltage detector 24 or processor 26 can be used to compare the output voltages of the different phases of the motor controller in order to determine any mismatch therebetween.

The processor 26 calculates gain corrections to correct for the phase mismatches at the output of the motor controller, as will be detailed below. In this example, three gain corrections ($Gadd^A$, $Gadd^B$, $Gadd^C$) are calculated and stored in a memory 28 or in registers of the processor 26 or gain compensation stage 10, wherein the gain correction is applied. Preferably, the gain compensation stage 10 is incorporated in the processor 26. In operation, the gain compensation stage 10 inputs original gains, $Gorig^A$, $Gorig^B$, $Gorig^C$ (i.e. gains that are externally determined to provide a required torque assist from the motor controller to an electric power steering system), and adds the gains correction factors $Gadd^A$, $Gadd^B$, $Gadd^C$. The compensated gains are then applied to input modulators 12. The gain stage 10 includes registers which can be reloaded periodically depending on changes of the amplitudes and the phase angles of the modulating signals from the voltage detector 24. In other words, as the gain or gain compensation changes, the registers can be updated. Preferably, updates are conducted in real time. Although the compensated gain for each phase can be a constant, it would be preferable to adjust the gain correction for each phase in real time as a function of phase angle, as will be detailed below.

The input modulators 12 provide the sinusoidal drive signals for each phase of the motor controller, each sinusoid symmetrically distributed about 360°. For the three phase example shown, each phase is separated by 120° (shown as $\sin(\theta)$, $\sin(\theta+120)$, $\sin(\theta-120)$ for the three phase system). The modulating signal of each phase is preferably calculated by multiplying the sine of each phase angle by the respective compensated gain for each phase. Standardized digital sinusoidal templates are stored in the memory 28, or other registers in the form of a lookup table 15, although these values could also be calculated as required. These templates are applied in the input modulators 12 and multiplied by the compensated gain to provide corrected sinusoidal drive signals of the appropriate amplitude. Phase grounding 16 is applied to the sinusoidal signals to reduce the amount of switching performed by the inverter circuit 22. In practice, the processor 26 provides phase grounding by normalizing the most negative phase voltage in each operational phase to a negative power supply rail. Phase grounding in regard to gain compensation will be detailed below.

The processor 26 establishes the switching sequence of six FET power switches of the inverter 22 by programming the PWM signals from the PWM generator 18. The switching sequence establishes the desired frequency and amplitude of the output of the motor controller. The PWM generator 18 generates six pulse trains (two complementary pulse trains for each phase) to the gate drive 20. The gate drive 20 then provides six digital pulse trains (i.e. three complementary pairs of digital waveforms) for each power switch. The PWM generator 18 includes a dedicated timer block to maintain the modulating frequency of the gate drive 20 and the timing intervals between the upper and the lower FET power switches of the inverter 22. Dedicated registers generate the pulse widths for each leg (phase) of the inverter 22.

The gate drive 20 generates six PWM outputs that interface TTL logic to convert battery power into three phases of variable alternating current to drive the inverter FETs. The pulse width of the output waveform varies sinusoidally with the electrical rotational frequency of the motor controller. The motor controller voltage frequency is known as the modulating frequency. In operation, a motor's winding inductance filters out the relatively high frequency pulse-width-modulating frequency. The resulting phase current flows at the modulating frequency. A pulse-width-modulating frequency of twenty kilohertz is used in one exemplary embodiment because this frequency is above the audio detectable range. The frequency and amplitude of the pulse-width-modulating signals, of course, will vary with the intended application of the motor controller. Each output is capable of driving a peak current on the order of one Ampere. Preferably, a peak current of one Ampere is sufficient to turn on and turn off the power switches rapidly, maximizing the efficiency of the system and minimizing output waveform distortion.

The six FET power switches of the inverter 22 are arranged in a three-phase inverter configuration using three inverter legs, as is known in the art. In this three phase example, two power switches are disposed in series in each leg. Preferably, a maximum of three switches can be turned on at one instant, with only one switch being active per inverter leg. Preferably, there is a time interval between the opening of one switch in one inverter leg and the closing of a complementary switch in the same leg to allow the current conducting through the one switch to reach approximately zero. The time interval is preferably on the order of about 2% to about 5% of the pulse-width-modulated periodic time. The PWM generation block 18 implements this time interval under command of the processor 26, which controls this time interval in the exemplary embodiments.

It is desirable to have three phase currents flow through a motor simultaneously such that the instantaneous currents sum to zero, are displaced in phase by 120 degrees, have a sinusoidal shape, and have the same amplitude. In other words, preferably the inverter 22 drives balanced three-phase sinusoidal currents. However, mismatches in components in the power and drive circuit can cause an unbalanced condition, i.e. torque ripple.

Optionally, the motor controller includes a phase advance 14, under control of the processor 26. Due to the inductive nature of a motor such as a permanent magnet synchronous motor (PMSM), the phase lag between the motor phase current and voltage applied to that phase will change depending upon the speed of the motor. As motor speed increases, the motor phase current lags the applied phase voltage by ever increasing amounts. However, the motor phase current relationship to the rotor angle must be maintained if the desired motor torque is to be produced. Therefore, phase advance 14 uses a motor speed 19 as a feedback signal to compensate for speed related delays by generating an advance angle which is added to the motor position signal before the lookup table 15. Motor position and speed feedback 19 can be directly measured through a motor shaft photoelectric encoder or a resolver, for example, and as are known in the art. A separate speed feedback device, such as a tachometer, can be used to determine motor speed also. Alternatively, motor position and speed 19 can be estimated using a real-time model to estimate shaft angular velocity from a measured motor voltage and/or current (i.e. electromotive or magnetomotive force), as is also known in the art.

Typically, the output of the motor controller is derived using an open-loop process that does not correct for unbalanced output voltages or currents. The present invention addresses this problem by balancing the voltage output of the motor controller during open loop mode. Of course, closed loop systems are used in other exemplary embodiments, wherein the current that flows in each phase is measured or estimated and balanced when needed by modifying the applied voltage to maintain balanced currents. A closed loop may also be employed around the voltage loop to ensure that unbalances in the applied voltage are corrected for. Therefore, in the open loop mode, the amplitude and frequency of the output of the motor controller is monitored and measured by the voltage detector 24 and the processor 26 for torque ripple.

Figure 2:
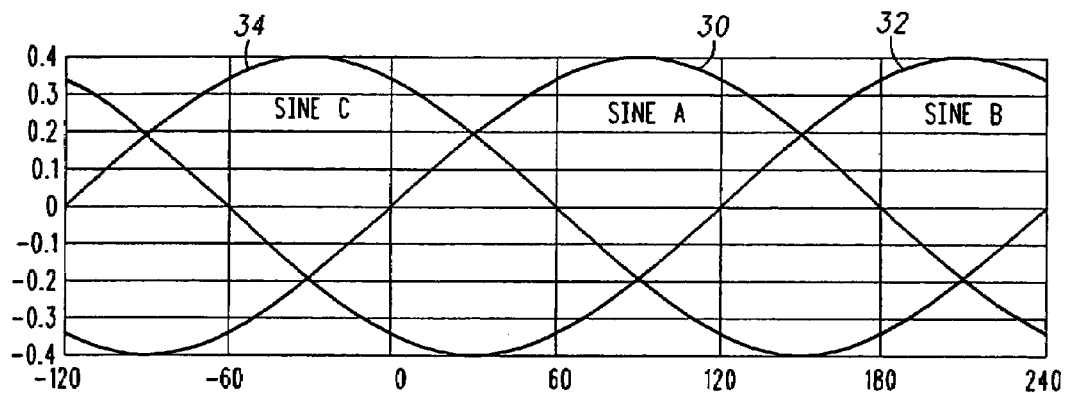
FIG. 2 shows a graphical representation of ideal sinusoidal wave for generating phase modulation in the motor controller of FIG. 1.

FIG. 2 shows the ideal sinusoidal waves which are stored in a table of the memory 28 as a series of digital steps. Three waves are shown, Sine A 30 (i.e. sin(θ)), Sine B 32 (i.e. sin(θ+120)), and Sine C 34 (i.e. sin(θ−120)). As a reference, Sine A has a zero crossing at zero degrees phase. These sinusoidal waves are multiplied by a voltage amplitude gain that comes from a torque assist algorithm and a compensation gain for torque ripple that comes from the processor. This overall amplitude corresponds to the amount of torque assist required by the steering assist system.

Figure 3:
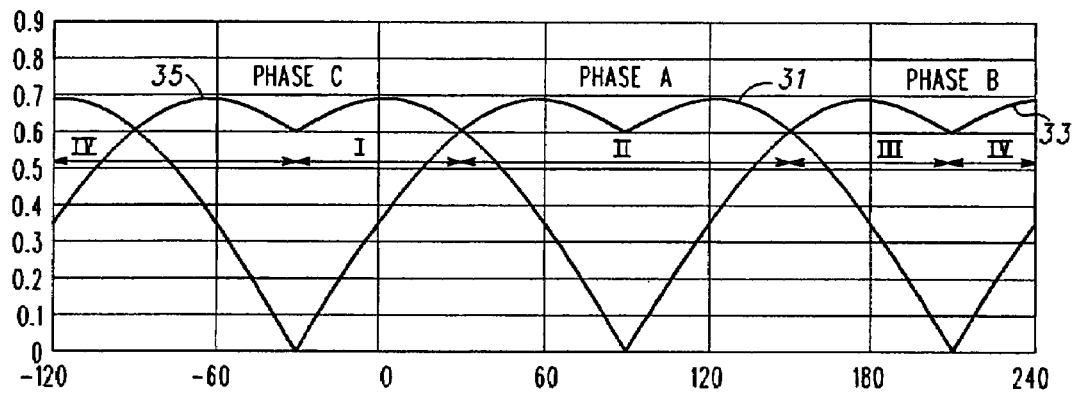
FIG. 3 shows a graphical representation of ideal phase-grounded waves from FIG. 2.

The variable amplitude sinusoidal waves are further processed by a well-known technique, called phase-grounding, to reduce switching losses, as shown for the ideal case in FIG. 3. This technique is based on the fact that the motor responds to the differential voltages phase to phase, not the absolute voltages. Consequently, at each instant of time, the same voltage is subtracted from each phase until the most negative voltage is on the negative rail. Each phase will be most negative for 120 deg, and will become the phase-grounded phase. Three waveforms are shown, phase A 31 which is non-zero from −30 degrees to +210 degrees and zero from +210 degrees to −30 degrees, phase B 33 which is non-zero from +90 degrees to −30 degrees and zero from −30 degrees to +90 degrees, and phase C 35 which is non-zero from +210 degrees to +90 degrees and zero from +90 degrees to +210 degrees. It should be noted that the voltage required to reduce the most negative phase to the negative rail changes with time and amplitude. As a result this phase grounding phase must be calculated in real time. This technique reduces switching losses because one switch of the lower three switches is on continuously for 120 degrees. Otherwise, without the present invention, this switch would be switching at the PWM frequency. In the example shown in FIG. 3, there is no torque ripple as all of the waveforms are balanced.

Once the phase grounded waveforms are constructed, the next step in the process is to generate a PWM pulse train, as detailed above. At low amplitude values of the modulating sinusoids, the PWM pulses are narrow and any nonlinearity in the gate drive or FETs will add or subtract to the width of the output voltage of the motor controller. For example, if 1% of the pulse is added to the full value, and the switching frequency is 20 kHz, the pulse width is 500 ns. A variation of 50 ns will result in a 10% change in motor current, and subsequently torque. This 50 ns may be a result of gate drive propagation mismatch between any two channels in the gate drive or may be a result of FET parameter variation. This 50 ns error is added to each pulse, irregardless of pulse width.

Figure 4:
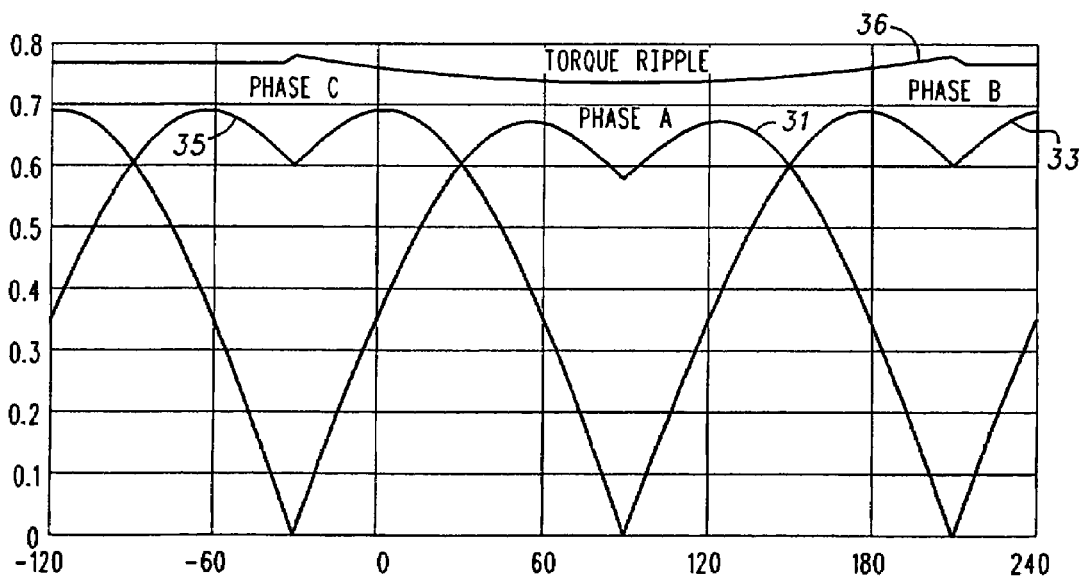
FIG. 4 shows a graphical representation of phase-grounded waves that exhibit torque ripple.

Only the sinusoidal amplitude (gain) is available as a compensation means to correct the errors introduced by the power stage (gate drive and FETs) into the phase grounded waveforms. This limitation complicates the need to balance the phase-grounded waveforms because direct access to these waveforms is not available. A typical error is shown in FIG. 4 where one of the phase-grounded waveforms (phase A 31) has an offset demonstrated by a lower amplitude than phases B or C, resulting in voltage amplitude reduction of the motor controller for phase A. Measuring the output voltage determines which phases are incorrect and the amount by which they are incorrect. Since the motor controller operates by providing a differential drive between phases, one of the phases can be taken as a reference (i.e. normalization to that phase) and, at most, only two out of the three phases needs to be compensated. As can be seen the resulting torque ripple 36 introduces drive error not only due to the change in amplitude, but also due to the zero crossing shifts caused by the lower amplitude waveform. In other words, there is a discontinuity of FET switching at −30 degrees and +210 degrees where the zero crossings are not coincident, wherein Phase A is used as the reference waveform in this example.

There are two aspects of the torque ripple reduction technique addressed by the present invention: i) the gain necessary to correct for the offset must be varied as a function of angle, and ii) the sinusoidal wave of the affected phase passes through zero when the associated phase-grounded waveform is non-zero and needs to be corrected.

From FIG. 3, it can be seen that one of the phases (phase A in this example) is grounded in the +210 degree to −30 degree interval (120 degrees) when referenced to the original sinusoidal wave (from FIG. 2). Amplitude changes to the phase grounded waveform can only be implemented by varying the amplitude of the corresponding sinusoid, because of the hardware configuration. In this example, due to mismatch problems, phase A (31 in FIG. 4) shows a negative gain offset in the phase-grounded waveform. To correct this, a simple solution in a first embodiment is to add a constant gain to the original sinusoid waveform to balance the phase-grounded waveform with those of the remaining phases (B and C). The increase in gain of this sinusoid (phase A) is in the −30 degree to +210 degree interval. Once the additional gain ($G_{add}$) is determined, this value is added to the original gain ($G_{orig}$) if the angle of the corresponding sinusoidal wave is in the 240 degree interval.

Although the gain addition will serve to raise the amplitude of the phase-grounded waveform (Phase A) to match that of the remaining phases (B and C), thereby flattening the torque ripple by more than 50%, the zero crossing problem is not addressed and there will still be torque ripple problems due to the zero-crossing discontinuities. In other words, applying a gain when the original sinusoid is at or near 0 or 180 degrees will not affect the waveform at that point since A*sin(0)=0 and A*sin(180)=0 for any A. Therefore, there are still two problems that exist with this simplified solution of the first embodiment: i) the required offset cannot be obtained by changing the gain of phase A when the sinusoidal wave is at/near zero amplitude ii) a variable gain is needed because the sinusoid changes amplitude as a function of angle.

A preferred embodiment of the present invention provides a further improved compensation method that reduces both of these problems, as described below.

Referring back to FIG. 3, the phase to be corrected (phase A in this example) is divided into three distinct regions: I) −30 degrees to +30 degrees II) +30 degrees to +150 degrees, and III) +150 degrees to +210 degrees. To be complete, a fourth range IV of +210 degrees to −30 degrees is shown outside of the phase A range, where phase A is grounded. In the example below, the amount of offset required is denoted by ΔA and is positive when a positive offset needs to be added (original minus modified).

In regions I and III, phase A is not increased as in the first embodiment. Instead, phases B and C are reduced by the required offset amount. In this way, problems which exist near 0 degrees and 180 degrees are avoided. In region I, phase C is used to generate the offset because it is not the most negative phase and it is near its peak value. This also helps to reduce round off problems which occur near 0 degrees with fixed point lookup tables. In region III, phase B is used to generate the offset.

In all regions, the gain must be adjusted as a function of angle to maintain a constant offset. The offset for region II is determined by the angle of phase A alone, denoted by $G_{add}^A$. However, in regions I and III, the offset is a function of angles B and C, denoted by $G_{add}^B$ and $G_{add}^C$, respectively.

In region I:

$$G_{add}^B = -\Delta A/\sin(\theta_A + 120)$$

wherein, $\sin(\theta_A + 120)$ is positive so $G_{add}^B$ must have different sign from $G_{add}^A$, and $$G_{add}^C = -\Delta A/\sin(\theta_A + 120)$$

In region II:

$$G_{add}^A = \Delta A/\sin \theta_A$$

In region III:

$$G_{add}^B = -\Delta A/\sin(\theta_A - 120)$$

$$G_{add}^C = -\Delta A/\sin(\theta_A - 120)$$

Table I summarizes the total gain plus gain compensation applied in different regions of the phase-grounded waveform to be corrected.

TABLE 1

Gain compensation

| Region | $G^A$ | $G^B$ | $G^C$ |
|---|---|---|---|
| I | $G_{orig}^A$ | $G_{orig}^B - \Delta A/\sin(\theta_A + 120)$ | $G_{orig}^C - \Delta A/\sin(\theta_A + 120)$ |
| II | $G_{orig}^A + \Delta A/\sin \theta_A$ | $G_{orig}^B$ | $G_{orig}^C$ |
| III | $G_{orig}^A$ | $G_{orig}^B - \Delta A/\sin(\theta_A - 120)$ | $G_{orig}^C - \Delta A/\sin(\theta_A - 120)$ |
| IV | $G_{orig}^A$ | $G_{orig}^B$ | $G_{orig}^C$ |

Figure 5:
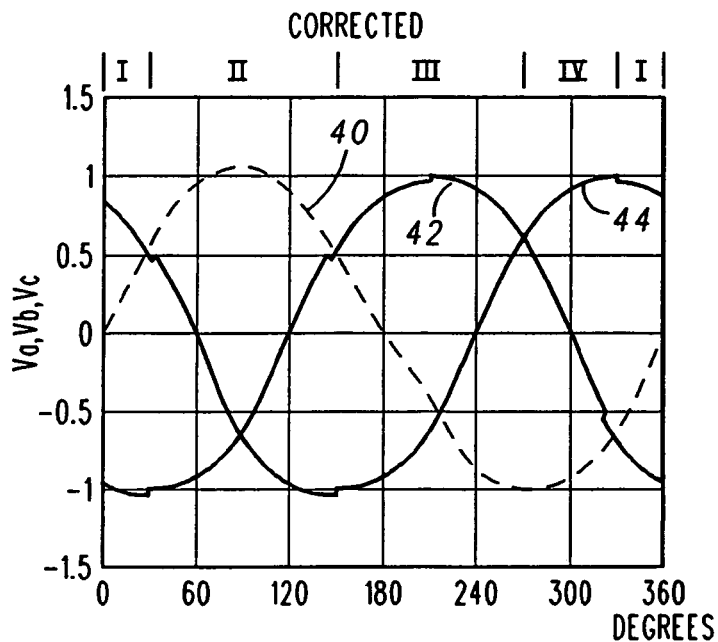
FIG. 5 illustrates the phase voltages measured during an open circuit condition as simulated by the process of FIG. 6.

Referring to FIG. 5, the waveforms of FIG. 2 are corrected in accordance with the preferred embodiment of Table I. Of particular interest is regions I and III, wherein the sinusoidal waveforms of phase B 42 and phase C 44 are lowered, compensating for any zero-crossing discontinuities in phase A 40 near 0 or 180 degrees after phase-grounding. This reduces the second-order effects in the torque ripple. In region II, phase A can be compensated by itself. Region IV is the trivial case where phase A will be grounded. In addition, gain is applied as a function of angle in all regions, thereby further reducing first order torque ripple effects. As a result, the voltage are now balanced and the resulting phase grounding waveforms appear as those of FIG. 3.

Figure 6:
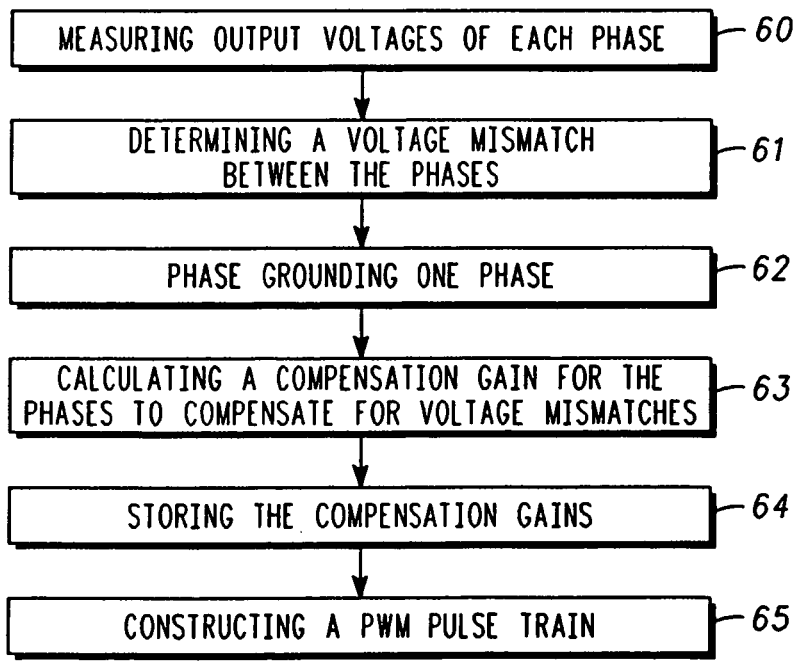
FIG. 6 shows a flow chart simulation of an open circuit and short circuit condition.

Referring to FIG. 6, the present invention also incorporates a method for reducing torque ripple in a motor controller. The method includes a first step 60 of measuring output voltages of each phase of the motor controller. A next step 61 includes determining a voltage mismatch between the phases of the motor controller. A next step 62 includes phase grounding one phase of the motor controller. In practice, the phase grounding step 62 includes normalizing the most negative phase voltage in each operational phase to a negative power supply rail. A next step 63 includes calculating a compensation gain for the phases to compensate for voltage mismatches. A next step 64 includes storing the compensation gains for the phases in a memory. A next step 65 includes constructing a PWM pulse train for driving a motor.

Steps 60 and 61 can be performed at the end of an assembly line when the motor and controller are first connected together. In this case, the phase-grounded voltage measurements can be taken by the test equipment and the correction factors written to the memory 28. In a preferred embodiment, two voltage measurements are taken at the crossover points of FIG. 4 i.e. −90 deg (33 and 35), 30 deg (31 and 35) and 150 deg (31 and 33) for a total of six 6 readings. An average is determined separately for each waveform 31, 33 and 35 and an overall average is also determined. The overall average is compared to each separate averages to determine which waveform is closest to the overall average. This closest overall average waveform remains unchanged in the correction scheme outlined above. The other two waveforms are adjusted appropriately so that the crossover points move in the direction of the overall average crossover points. The actual gain correction terms written to memory are a function of the particular system parameters. For example, gain_offset=1000* (global average−crossover average).

In a preferred embodiment, the calculating step 63 includes adjusting the gain for each of the phases in real time as a function of phase angle. The compensating gain can include an adjusted gain, as a function of angle, and/or an offset. More preferably, the calculating step includes dividing the operating angle of the motor controller into four regions, wherein gain is compensated per region. Two of the regions straddle the 0 degree and 180 degree operational points of the one phase. One of the regions includes phase grounding the one phase, and the other region encompasses an active region of the one phase, wherein the one phase is gain compensated as a function of angle. In the two straddling regions, the remaining phases are offset relative to the one phase in the two regions.

The system and method can be implemented, in part, by preferably using a 68HC708 MP16 micro-controller available from Motorola, Inc. or a TMS320C240 digital signal processor available from Texas Instrument, Inc.; an IR 2130 gate drive integrated circuit available from International Rectifier, Inc.; and #IRFP048N Metal-Oxide-Semiconductor-Field-Effect-Transistors available from International Rectifier.

The solution proposed here is a cost effective way to reduce torque ripple by eliminating voltage imbalance in a voltage mode motor controller without adding any extra circuitry, yet meeting very stringent performance criteria at low phase voltage amplitudes. It is based on output voltage measurements which characterize every module and correct for problems on a per-phase basis. Experimental data verifies that the correction technique of the present invention reduces the 1-per rev torque ripple component by more that 50%, thereby reducing controller fallout in production.

Although the present invention details the construction of an electric power steering system, this invention can have other application to any multi-phase electric motor controller system. In many applications, where a motor is driven by a voltage source, a current loop is closed to regulate the phase current supplied to the motor. In this case, the phase voltage imbalance and resulting current imbalance are compensated by the current loop. In applications where a closed current is not used, a closed voltage loop is often used to ensure that even phase voltage is applied to the motor. In applications where neither a closed current nor voltage loop is used, the present invention can be utilized to reduce torque ripple problems.

While the present invention has been particularly shown and described with reference to particular embodiments thereof, it will be understood by those skilled in the art that various changes may be made and equivalents substituted for elements thereof without departing from the broad scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A system to reduce torque ripple in a motor controller, the system comprising:
   a voltage detector that detects output voltage at each phase of the motor controller;
   a gain stage operable to apply gain compensation for each phase of the motor controller;
   a PWM driving circuit for driving a motor; and
   a processor with an input coupled to the voltage detector and an output coupled to the gain stage, the processor inputs the voltage at each phase of the motor controller from the sensor, determines a voltage mismatch between the phases; phase grounds the most negative phase of the motor controller, calculates a voltage gain for the phases to compensate for voltage mismatches therebetween.

2. The system of claim 1, wherein the processor provides phase grounding by normalizing the most negative phase voltage in each operational phase to a negative power supply rail.

3. The system of claim 1, wherein the processor adjusts the gain of the phases in real time as a function of phase angle.

4. The system of claim 1, wherein the processor divides the operating angle of the motor controller into four regions, wherein the gains of different phases are compensated per region.

5. The system of claim 4, wherein two of the regions span the 0 degree and 180 degree operational points of the one phase.

6. The system of claim 1, further comprising a memory wherein the processor stores the compensation voltage gains for the phases in a memory.

7. A method for reducing torque ripple in a motor controller, the method comprising the steps of:
   measuring output voltages of each phase of the motor controller;
   determining a voltage mismatch between the phases of the motor controller;
   phase grounding one phase of the motor controller; and
   calculating a compensation gain for the phases to compensate for voltage mismatches.

8. The method of claim 7, further comprising the step of storing the compensation gains for the phases in a memory.

9. The method of claim 7, wherein the phase grounding step includes normalizing the most negative phase voltage in each operational phase to a negative power supply rail.

10. The method of claim 7, further comprising the step of constructing a PWM pulse train for driving a motor.

11. The method of claim 7, wherein the calculating step includes adjusting the gain for each of the phases in real time as a function of phase angle.

12. The method of claim 7, wherein the calculating step includes dividing the operating angle of the motor controller into four regions, wherein the gains of different phases are compensated per region.

13. The method of claim 12, wherein two of the regions span the 0 degree and 180 degree operational points of the one phase.

14. A method for reducing torque ripple in a motor controller, the method comprising the steps of:
   measuring output voltages of each phase of the motor controller;
   determining a voltage mismatch between the phases of the motor controller;
   phase grounding the most negative phase of the motor controller;
   calculating a compensation gain, as a function of angle, for the phases to compensate for voltage mismatches therebetween; and
   constructing a PWM pulse train for driving a motor.

15. The method of claim 14, wherein the calculating step includes calculating the compensation gain for each of the phases in real time.

16. The method of claim 14, wherein the phase grounding step includes normalizing the most negative phase voltage in each operational phase to a negative power supply rail.

17. The method of claim 14, wherein the calculating step includes dividing the operating angle of the motor controller into four regions, wherein the gains of different phases are compensated per region.

18. The method of claim 17, wherein two of the regions span the 0 degree and 180 degree operational points of the one phase.

19. The method of claim 18, wherein the remaining phases are offset relative to the one phase in the two regions, and the one phase is compensated in a non-grounded region.

* * * * *